Aug. 1, 1967 K. E. BURG ETAL 3,334,328
ACOUSTICAL RADIATING ANTENNA
Filed July 1, 1963 4 Sheets-Sheet 1

Kenneth E. Burg
Edwin B. Neitzel
INVENTORS

BY James O. Dixon
ATTORNEY

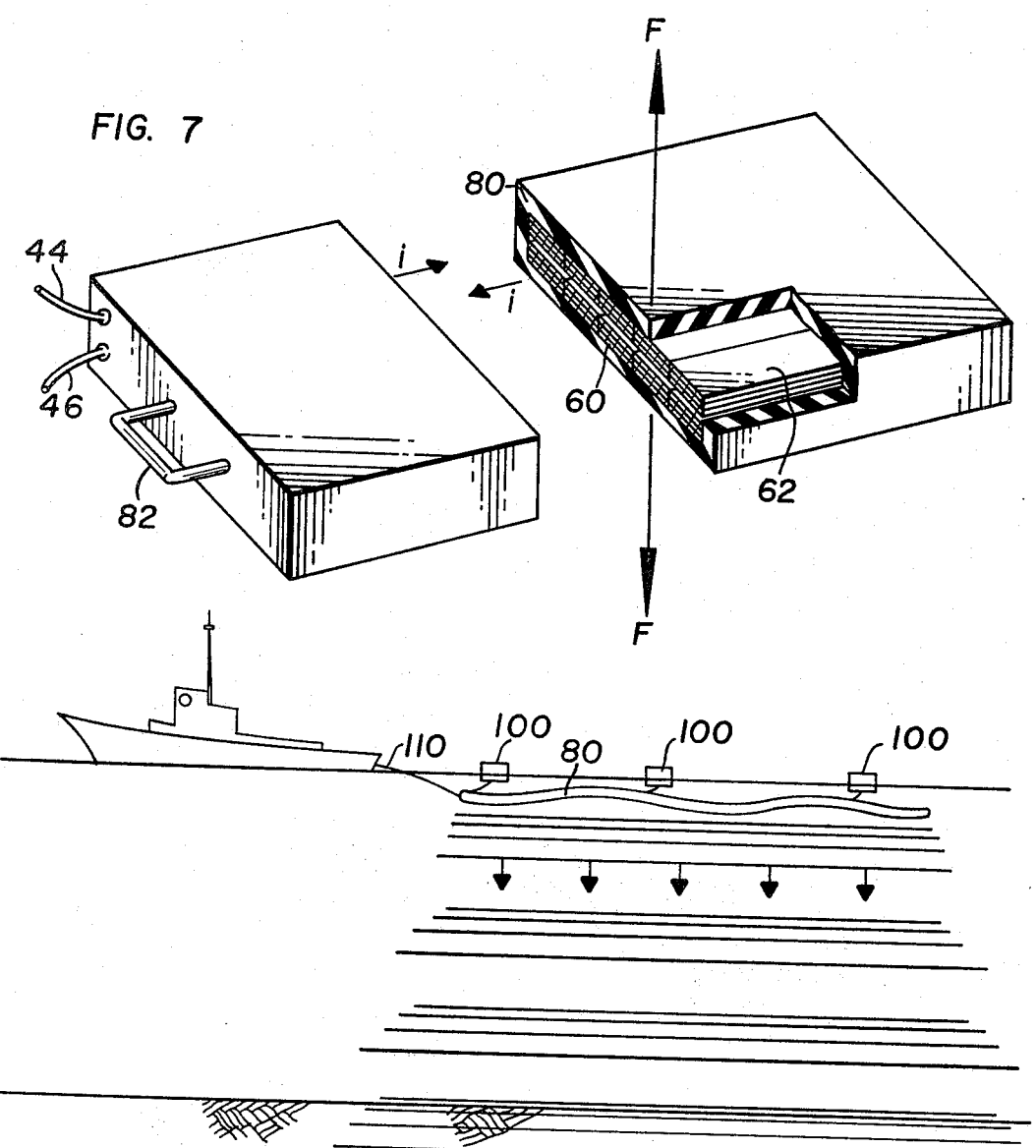

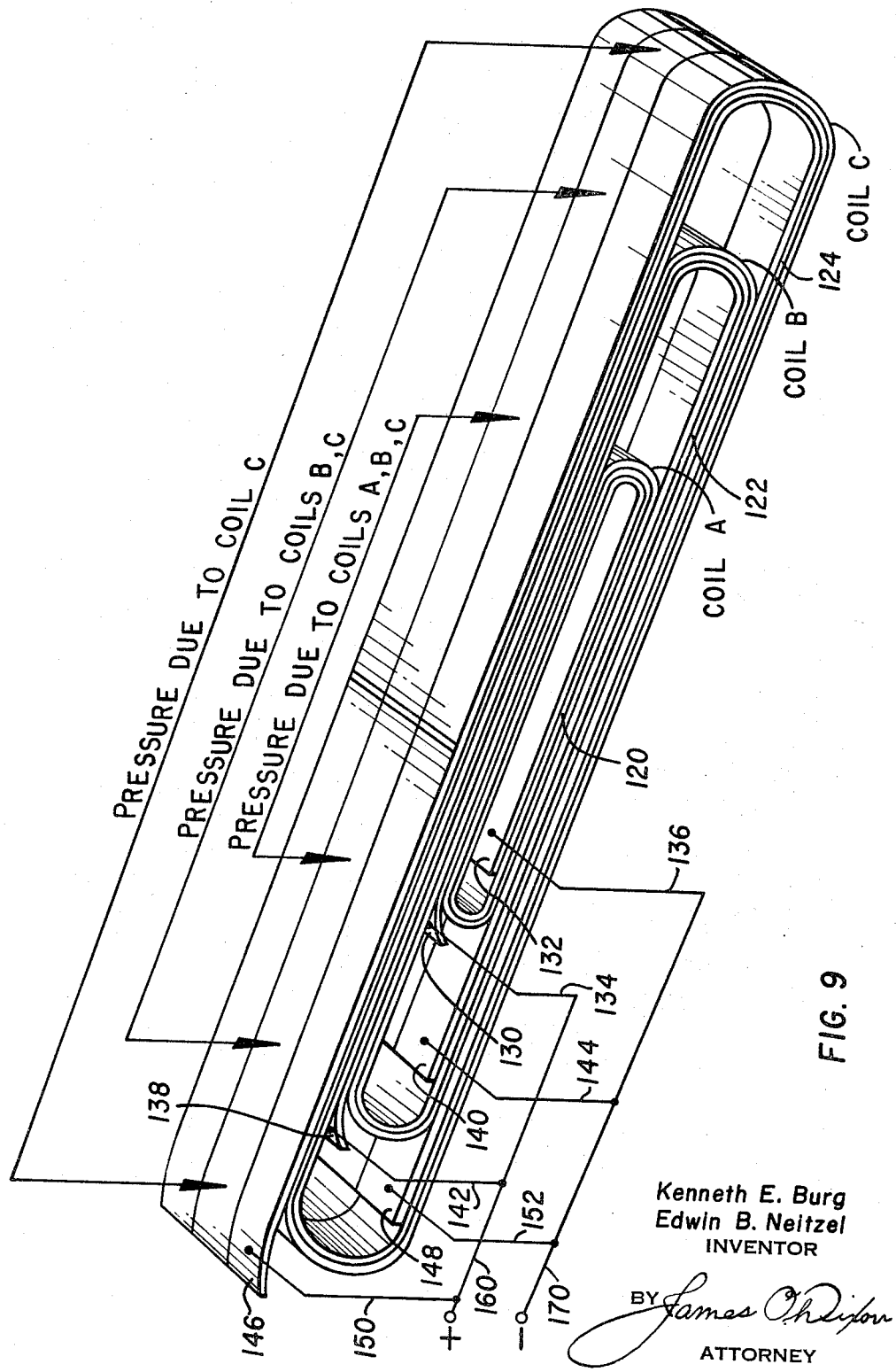

United States Patent Office 3,334,328
Patented Aug. 1, 1967

3,334,328
ACOUSTICAL RADIATING ANTENNA
Kenneth E. Burg and Edwin B. Neitzel, Dallas, Tex., assignors to Texas Instruments Incorporated, Dallas, Tex., a corporation of Delaware
Filed July 1, 1963, Ser. No. 291,716
17 Claims. (Cl. 340—17)

The present invention relates to apparatus for generating a pressure impulse for seismic prospecting, and more particularly relates to an acoustical antenna of finite length.

This invention constitutes an improvement over the invention described in the copending application of Edwin B. Neitzel, entitled Impulse Generator, Ser. No. 291,715 filed concurrently herewith and assigned to the common assignee and now abandoned. Said Neitzel application also relates to an apparatus for generating a pressure impulse for seismic prospecting, and discloses the broad concept and basic principle for the generation of the impulse as used in the present invention. The present invention provides an apparatus which has special application as an acoustical antenna of finite length and is equivalent to a continuous array of point sources distributed along the length thereof. Thus this invention provides apparatus possessing specially advantageous features for certain applications of which the apparatus of the copending application, supra, is not capable.

In seismic prospecting the most commonly used sources of seismic energy are those which are equivalent to point sources. For example, a charge of dynamite when exploded appears as a point source of acoustical energy in relation to the seismometers that record this energy after reflection of the wave from subsurface strata. A point source of acoustical energy is equivalent to saying that the lateral dimensions of the area over which the energy is generated at the source are small as compared to the wavelength of the frequency components of the reflected impulsive signal.

A large amount of the source energy is lost due to spreading or the geometrical divergence factors. This invention overcomes this difficulty to a large extent by providing a line transmitter that functions as an acoustical antenna of finite, but extended length. The total energy of the antenna is distributed over an area of much greater lateral dimensions than previous seismic sources, and in this manner, a large degree of directivity of the pressure wave is achieved. Consequently, much less of the total energy is lost to spreading as compared to conventional sources, and a higher acoustical efficiency results. For a discussion of an antenna of finite length which is equivalent to a continuous array of point sources distributed along the length, reference is made to Kraus, John D., Antennas, McGraw-Hill Book Company, Inc. (1950), pp. 110–114.

In addition to the antenna feature, which will be described in detail hereinafter, this invention has the additional advantages as a seismic source as set out in the copending application, supra. This antenna has particular application as a seismic source where it is important to know precisely the frequency and power characteristic of the source and the exact instant the impulse generated thereby is initiated. Moreover, the frequency content of the impulse can be varied to optimize the results achieved for the particular geographical location of operation.

Another significant feature is the decrease in the cavitation impulse pressure, which is caused by a high pressure impulse generated in a fluid, when the fluid collapses into the void created by the impulse. This cavitation impulse is undesirable because of its uncontrolled frequency content and because it adds noise to the seismic signal. By spreading the total signal over a large area, as will become apparent from a description of a preferred embodiment of the invention, the cavitation pressure is reduced to a minimum and is no longer troublesome.

It is therefore an object of the present invention to provide an apparatus for generating a highly directional pressure impulse in a medium.

Another object is to provide a highly directional acoustical antenna of finite length for use as a seismic source.

It is another object to provide an acoustical antenna according to the last-mentioned object that is flexible and is adapted for under-water or off-shore operation.

Yet another object is to provide an apparatus for generating a highly directional pressure impulse in a medium the frequency characeristics of which can be adjusted to any desired range.

A further object is to provide an acoustical antenna for generating an acoustical pulse in a fluid while maintaining the cavitation pressure at a minimum.

Other objects, features and advantages will become apparent from the following description when taken in conjunction with the appended claims and the attached drawings in which like reference numerals refer to like parts throughout the several figures, and in which:

FIGURE 7 is a view, partly in section, of a preferred embodiment of the acoustical antenna showing the conductor configuration of FIGURE 5 encapsulated in a flexible insulator;

FIGURE 8 illustrates the use of the acoustical antenna for off-shore exploration; and FIGURE 9 is a side elevational view of a modification of the acoustical antenna constructed so as to cause an attenuation of pressure along its length.

Figure 1:
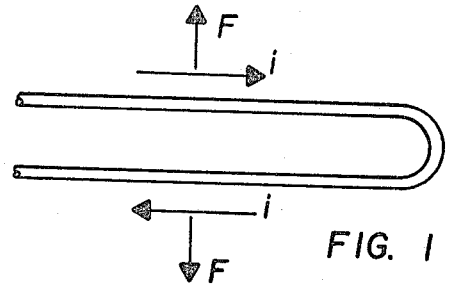
FIGURE 1 is an electrical conductor configuration showing the opposing force generated between parallel conductors carrying oppositely directed currents and illustrates one of the principles utilized by the invention.

The invention utilizes the well-known principle that electrical charge flowing in opposite directions in parallel conductors produces an opposing force between the conductors that is proportional to the product of the currents therein and inversely proportional to the distance of separation therebetween. The opposing force effect will be produced so long as there is a component of the current vector in one of the conductors that is opposite a component of the current vector in the other conductor, and the greatest force is realized when the net current vectors in the conductors are oppositely directed, this being the case of parallel conductors. The amount of force produced by this effect is easily controlled by regulating the current magnitudes in the conductor, whereas in contra-distinction to this effect a force produced between a current carrying conductor, such as a coil, and a metallic body in which eddy currents are generated due to the field of the coil is not easy to determine or control. Moreover, the opposite current effect utilized by this invention can produce a much greater force than by the eddy current effect.

The apparatus hereinafter described is so constructed to generate the force over a large area, and in particular, the transducer is elongated to provide a seismic line transmitter over an extended distance that acts as an acoustical antenna of finite length comprised of a continuous array of point sources. This gives directivity of the acoustical wave generated in contrast to a point source. The directional nature of the signal reduces the energy lost to scattering and spreading, and thus the overall efficiency of the seismic system is quite high.

The acoustical antenna is especially useful for offshore or underwater exploration, and the impulse is generated in the water and is coupled by means of the water to the earth beneath. As will be seen hereinafter, the antenna is flexible for purposes of generating the impulse, where the flexible nature of the transducer also gives it durability and portability.

An important feature is that the frequency characteristics of the seismic signal generated by the antenna can be controlled within wide limits. A pressure impulse can be generated by the antenna, the frequency spectrum of which lies entirely within the usable frequency band for seismic exploration. The frequency components of the force and their relative magnitudes can be virtually controlled at will, thus providing a source whose frequency characteristics may be altered to achieve optimum results in practically any locale of operation. More precisely, the subsurface strata in some geographical locations transmit some frequencies better than others and it is obviously desirable that the seismic source be adaptable for adjustment to achieve these optimum results, of which the antenna of this invention is capable.

It should be noted in connection with the frequency control that may be had over the seismic signal produced by the antenna, that whenever the transducer is adjusted to produce a given seismic signal, this signal may be reproduced exactly every time without change of its characteristics. This follows from the precise control that can be exercised over the electrical current used to generate the force, as will be seen more clearly hereinafter. This is extremely important when shooting a seismic pattern, because each trace, ideally, is a recording of the reflection of seismic signals of exactly the same characteristics. Thus errors in calculation in depth of given substrata of the earth are reduced or eliminated.

All of the above advantages and features will become apparent from the following detailed description of the invention. Specifically, there is shown in FIGURE 1 a conductor folded on itself to provide parallel portions carrying a current $i$ the direction of which is opposite in the two portions. The current produces an opposing force F between the conductor portions, and the force is proportional to the square of the current and inversely proportional to the distance of separation therebetween, or mathematically, $$F \alpha \frac{i^2}{d} \quad \text{(Eq. 1)}$$

where $d$ = distance of separation.

Figure 2:
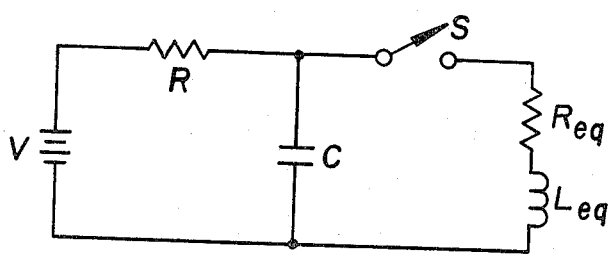
FIGURE 2 is an equivalent schematic circuit of the arrangement of FIGURE 1 in conjunction with an energy source for generating a current in the conductor.

The foregoing illustrates the principle utilized by the antenna for generating a force. Referring now to FIGURE 2 there is shown an equivalent schematic circuit of the arrangement of FIGURE 1 in conjunction with an energy source for generating a current in the conductor. In general, the conductor configuration is shown schematically as an equivalent inductor $L_{eq}$ in series with an equivalent resistor $R_{eq}$. The energy source comprises a suitable supply voltage V for charging a capacitor C, or a suitable capacitor bank. Initially, the switch S is opened, and the capacitor C is charged through the resistor R. Switch S is then closed to discharge the capacitor through the inductor, or conductor configuration of FIGURE 1, thus producing the opposing force F. The resistor R in this circuit is large as compared to the impedance of the series circuit comprised of C, S, $R_{eq}$ and $L_{eq}$, such that when S is closed, R acts as an open circuit.

The current in the equivalent circuit of FIGURE 2 can be expressed by an equation governing a free oscillating circuit comprised of an inductor, a resistor and a charged capacitor connected in series, namely $$V = \frac{1}{C}\int i\,dt + iR_{eq} + L_{eq}\cdot\frac{di}{dt} \quad \text{(Eq. 2)}$$

where

V is the voltage across the charged capacitor C, and
$i$ is the current in the circuit.

Because of the equivalent series resistance of the circuit, the oscillations will be damped. The current in the circuit as a function of time can then be shown to be expressed by the relation $$i(t) = \frac{V}{L_{eq}}\cdot\frac{1}{\beta}\cdot e^{-\alpha t}\sin\beta t \quad \text{(Eq. 3)}$$

where $$\alpha = \frac{R_{eq}}{2L_{eq}}$$

$$\beta = \sqrt{\frac{1}{L_{eq}C} - \frac{R_{eq}^2}{4L_{eq}^2}}, \text{ and}$$

$t$ = time

The above equation is derived by taking the Laplace transform of the current function and then taking the inverse transform. Reference is made to Garner and Barnes, Transients in Linear Systems, John Wiley and Sons, page 342, equation 1.301, for the inverse transform function. Physically, the expression for the current in the circuit as a function of time states that the current is governed by the sinusoidal function sin $\beta t$, whose amplitude decreases exponentially, being governed by the function $e^{-\alpha t}$, and the period of which is constant. The current as a function of time is shown graphically in FIGURE 3 and denoted by $i(t)$. The constant period of this function will be noted, whereas the amplitude decreases exponentially with time.

Figure 3:
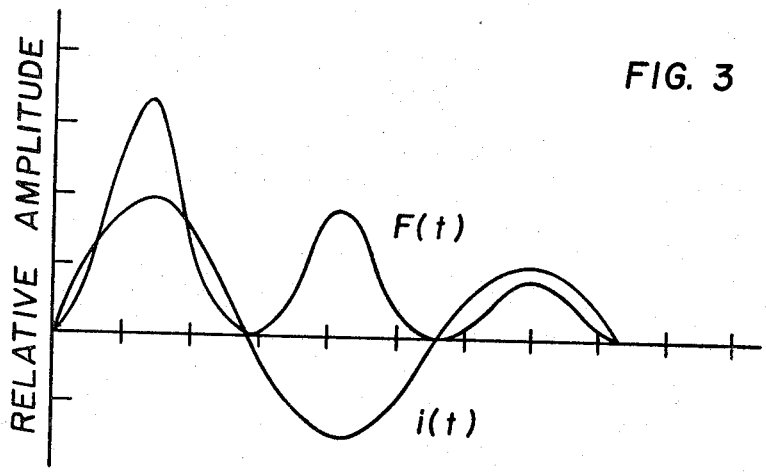
FIGURE 3 illustrates graphically as a function of time (a) the current through the equivalent inductor of the circuit shown in FIGURE 2, and (b) the opposing force between the portions of the conductor carrying the oppositely directed currents, as shown in FIGURE 1.

The force between the opposing portions of the conductor configuration of FIGURE 1 can be expressed as $$F = \frac{\mu_0 2 i^3}{d} \quad \text{(Eq. 4)}$$

where $\mu_0$ is the permeability of free space. The force between the portions of the conductor is attractive if the current is directionally the same, but in FIGURE 1, the current is oppositely directed and gives rise to an opposing force. The instantaneous force $F(t)$ can be expressed as $$F(t) = k\frac{i(t)^2}{d} \quad \text{(Eq. 5)}$$

where $i(t)$ is the instantaneous current as a function of time, and
$k$ is a constant The curve $F(t)$ shown in FIGURE 3 illustrates the relative magnitude of the force as a function of time. Since the force is directly proportional to the square of the current, the force is always positive. It will be noted that the force has a period equal to one half the period of the current, and that the amplitude of each decreases exponentially. From Equations 3 and 5, the force can be expressed as $$F(t) = k \frac{V^2}{L_{eq}^2} \cdot \frac{1}{\beta^2} \cdot e^{-2\alpha t} \sin^2 \beta t \qquad (Eq.\ 6)$$

The dominant or ringing frequency $f$ of the free oscillating series circuit is given by the equation $$f = \frac{1}{2\pi} \sqrt{\frac{1}{L_{eq}C} - \frac{R_{eq}^2}{4L_{eq}^2}} \qquad (Eq.\ 7)$$

The period of the force function is governed by the term $\sin^2 \beta t$ and its amplitude is governed by the term $e^{-2\alpha t}$.

The force function can be expressed in a Fourier series and is comprised of an infinite number of unique frequency components of various magnitudes. It is important to note from the Fourier transform the frequency response of the force function, since this will determine its usefulness as a seismic source. This follows from what has been said previously, viz., that the lower frequencies, say from 0 to 120 c.p.s., are far more efficient as a seismic signal than are the higher frequencies, such as those extending into the kilocycle range. In order to obtain the frequency response of the force, the Laplace transform of the force function is taken and can be expressed as $$F(\omega) = k \frac{2\left(\frac{V^2}{L_{eq}^2}\right)}{\sqrt{\omega^6 + \omega^4\left(-\frac{8}{L_{eq}C} + \frac{5R_{eq}^2}{L_{eq}^2}\right) + \omega^2\left(\frac{16}{L_{eq}^2C^2} - \frac{8R_{eq}^2}{L_{eq}^3C} + \frac{4R_{eq}^4}{L_{eq}^4}\right) + \frac{16R_{eq}^2}{L_{eq}^4C^4}}}$$

where $F(\omega)$ is the frequency response of the force function, $\omega = 2\pi f$, and $$k = \frac{\mu_0 2 l}{d}$$

Many of the terms in the denominator of the equation can be neglected in most instances upon substitution for the various parameters of the circuit. For the equivalent circuit of FIGURE 2, the equivalent inductance $L_{eq}$ is the inductance of the conductor configuration of FIGURE 1, and the equivalent resistance $R_{eq}$ is the series resistance of the circuit.

Figure 4:
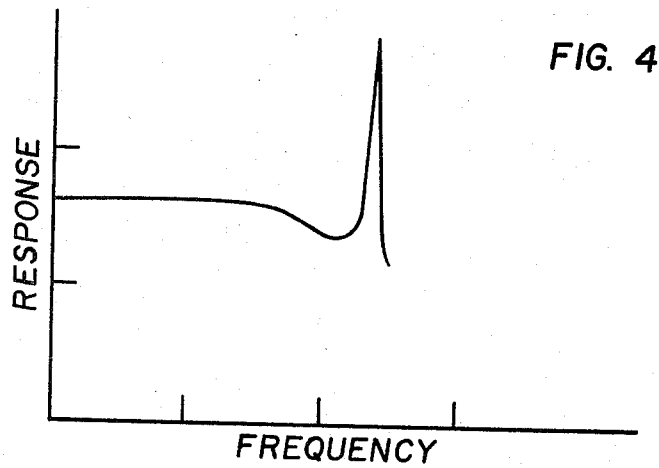
FIGURE 4 illustrates graphically the frequency spectrum in terms of relative magnitudes of the opposing force generated in the conductor configuration of FIGURE 1.

A representative curve of the frequency response for the force function for the circuit is shown in FIGURE 4 where the curve drops rapidly to zero at a frequency of about 50 c.p.s., with a peak occurring at a somewhat lower frequency. These absolute values are representative for circuit parameters ($L_{eq}$, $R_{eq}C$, $l$, $d$) to be given later, which are the values appropriate for the useful seismic range of from 0 to about 120 c.p.s.

Figure 5:
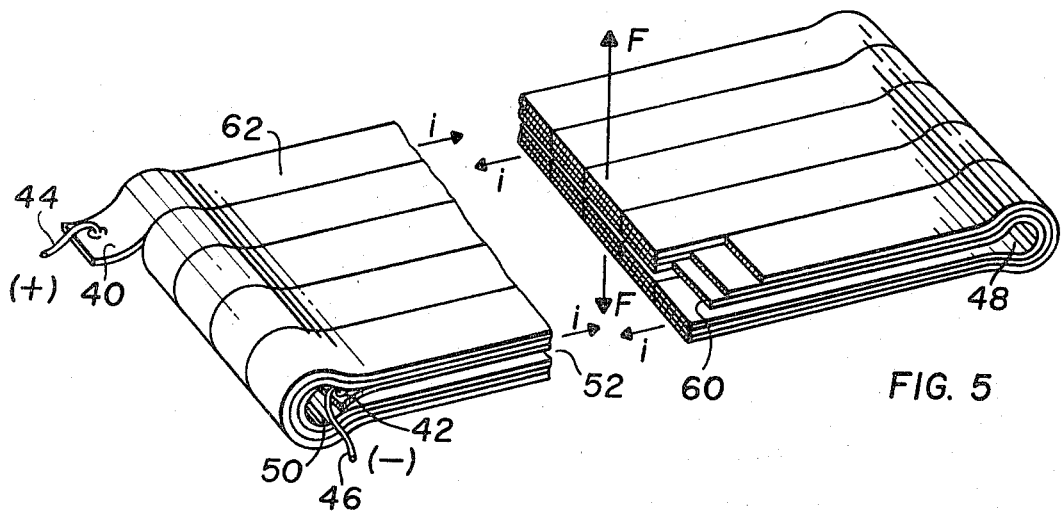
FIGURE 5 is a view, partly in section, of a preferred embodiment of the conductor configuration of the acoustical antenna of this invention.
Figure 6:
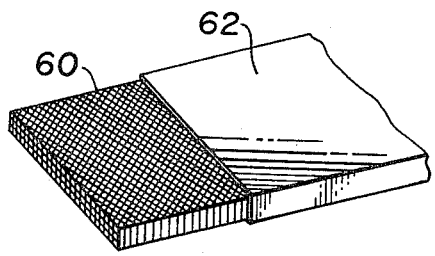
FIGURE 6 is a cutaway view of a preferred form of an insulated conductor to be used in the acoustical antenna.

Referring now to FIGURE 5 there is shown a view, partly in section, of a preferred embodiment of the conductor configuration of the seismic line transmitter. The preferred form of the conductor itself is shown partly in section in FIGURE 6, which is a metal cable 60 (for example, copper) having a thin coating of electrical insulation 62. Any suitable flexible metal cable of the proper current carrying capacity can be used such as that used for battery cable. A preferred insulation is Scotch electric tape No. 5, a trade name of the Minnesota Mining and Manufacturing Company of Minneapolis, Minn., although any other suitable insulation will suffice. A long length of the cable is wound back and forth on itself such as illustrated in FIGURE 5 to provide a parallel conductor configuration of several cable layers in thicknesses and of several cable widths across. To one end 40 of the cable there is attached an electrical connection 44, and to the other end 42 there is attached an electrical connection 46. There is no space provided between the upper and lower rows of cable when no current is flowing, although there is shown in FIGURE 5 a small separation 52 between the upper and lower rows to illustrate the flexibility of the conductors to permit a slight separation upon the generation of the opposing force. The insulation prevents any electrical shorting between the several lengths of the cable. As the cable is wrapped back and forth on itself, there is formed at the two ends loops 48 and 50. As a current is passed through the lengths of cable via the connections 44 and 46, as shown by the respective polarities (+) and (−), the current direction in all of the upper rows is the same, and the current in all of the lower rows is the same but oppositely directed to the current in the upper rows. Moreover, since the conductor configuration of FIGURE 5 is comprised of one continuous cable, each of the lengths thereof carries a current identical to all the other lengths. The current causes the opposing force previously described, and the loops 48 and 50 at the ends permit the slight separation between the upper and lower rows under the influence of the force. Because of the separation, a pressure wave or impulse is coupled to the medium adjacent the faces of the conductor configuration, whereas all the energy represented by the force would be dissipated as heat if the upper and lower rows were restricted and not allowed to separate.

It is to be understood that several individual lengths of cable can be used as an alternative to the one continuous length. In that event, each of the lengths of cable can be commonly connected at their ends to provide a configuration of several parallel connected conductors.

The conductor of FIGURE 5 is cast in a suitable insulating substance 80, such as plastic or rubber, as shown in FIGURE 7, to encapsulate and seal the conductor and provide a supporting structure. A preferred substance for this purpose is a neoprene rubber because of its excellent resiliency and durability. The neoprene is flexible enough to permit separation of the conductor portions as explained. For most applications the length of the conductor portions is several feet. The electrical connections 44 and 46 are sealed through the neoprene for connection to a current source, and a suitable handle 82 or equivalent is provided at one end for towing the line transmitter, as will be presently described. Upon the generation of a force between the conductor portions, the antenna flexes in a direction perpendicular to the faces thereof as a result of the force. The plastic nature of the neoprene 80 permits the flexure of the antenna, and additionally, acts as a restoring force for the opposing conductor portions after the expenditure of the energy represented by the pulse. When the antenna is used as an underwater acoustical source, there is an additional restoring force of about 15 pounds per square inch acting on each side of the transmitter for a depth of about 30 feet beneath the surface of the water. In this manner the antenna is made ready for the next current pulse.

The application of the antenna for off-shore exploration is illustrated in FIGURE 8. Here, it is towed behind a vessel with bouys 100 supporting it at the desired depth. A towing cable 110 connects the antenna with the vessel with electrical connections 44 and 46 being connected to a current generator on board. As a current is passed through the antenna a pressure wave is generated in a vertical direction as illustrated by the compressions and rarefactions beneath the antenna. The wave is generated by the opposing force between the upper and lower rows of conductors and causes the resilient antenna to flex in a vertical direction. The force is coupled to the water as a pressure disturbance at the antenna-water interface. The wave front propagates from the antenna to the water-earth interface in the same manner as a wave propagated from an antenna of finite, but extended length. It is coupled to the earth and is eventually reflected or refracted by subsurface strata, whence it returns to the surface and is picked up by recording seismometers (not shown). Because of the antenna effect, the pressure pulse takes the form of a plane propagating wave, or a wave front substantially similar to a plane wave. Hence a large percent of the acoustical energy generated at the source (antenna) returns to the seismometers, and consequently, the efficiency of the system is quite high.

Another distinct advantage of this antenna for underwater applications is that the cavitation impulse is maintained at a minimum. When a large disturbance is created in water, such as an explosion or the like, a void is created for a short duration. The collapse of the water into the void acts as an explosion or pressure burst itself, and the recording of these waves makes it difficult to distinguish them from the true impulse. Because the force generated by the antenna is distributed over an extended distance, the force at one point along its length is relatively small, although the total force generated is large. Thus the cavitation problem is maintained at a minimum and the seismic records produced thereby are more accurate.

As an example of the parameters and dimensions of the transmitter, battery cable (copper) having a thin coating of the Scotch electric insulating tape noted above is wound on itself as shown in FIGURE 5 to provide a conductor configuration of five rows across, and each of the upper and lower rows are comprised of 3 or 4 layers of cable. A braided copper battery cable of dimensions of about 0.75 inch by about 0.050 inch is used and is the braided equivalent of about No. 7 wire, A.W.G. Each of the rows (the length of the antenna) is about 50 feet long. This gives a total series resistance of about 2 ohms, and an equivalent inductance of a few millihenries, usually from 5–10 millihenries. A previously described cable is cast in a neoprene rubber.

The current supply comprises a capacitor bank of total capacitance of about 1000 microfarads, and a direct-current supply voltage of about 4000 volts. The discharge of the capacitor bank through the antenna produces a force the frequency components of which are within the range of 0–100 c.p.s. The amount of energy generated by the antenna is proportional to the product of the capacitance and the square of the charging voltage. For the parameters noted above, the total energy released by the antenna is in the order of several thousand joules, which is adequate for most seismic prospecting.

It is apparent that the above parameters can be varied to produce pressure impulses of a wide variety of frequency characteristics. The parameters for producing a pressure impulse of any particular frequency band can be determined, of course, from the preceding equations. The physical dimensions of the antenna are also subject to variation, but in general, the greater the area producing the impulse, the more directional is the propagated wave. For example, as the length of the antenna is reduced, the less directional is the propagated wave. It should not be construed, however, that a length of 50 feet is the minimum length that can be used with effectiveness, but rather this length is suitable for the purpose herein disclosed. On the other hand, the length of the antenna is substantially greater than the width in order to approximate or be equivalent to an antenna having a substantial degree of directivity.

A modification of the acoustical antenna is shown in FIGURE 9, which is a side elevational view of an antenna comprised of three separate coils A, B and C. Coil A comprised of layers 120 of braided wire constitutes the innermost section of the antenna and is constructed similarly to the coil shown in FIGURE 5. Coil B surrounds and has a greater length than coil A. Likewise, coil C surrounds both coils A and B and has a greater length than either coil A or B. Coil B comprised of layers 122 and coil C comprised of layers 124 are each constructed similarly to coil A. The only difference in construction of the coils and that shown in FIGURE 5 is that the layers comprising the coil are electrically connected in parallel, whereas the layers of the antenna of FIGURE 5 are electrically connected in series. However, this is immaterial as long as the upper layers of the coil are interconnected for carrying currents in the same direction. To the ends 130 and 132 of coil A are connected lead wires 134 and 136, respectively; likewise to ends 138 and 140 of coil B are connected lead wires 142 and 144, respectively; and to ends 146 and 148 of coil C are connected lead wires 150 and 152, respectively. Lead wires 134, 142 and 150 are commonly connected to terminal lead 160 and lead wires 136, 144 and 152 are commonly connected to terminal lead 170. A voltage source the same as described previously is connected across terminal leads 160 and 170 to provide power to the antenna. Because of the connections, the current directions in the upper halves of coils A, B and C are all the same, whereas the current directions in the lower halves of the coils are all the same but opposite to the direction of the upper halves. The antenna is supported in a resilient body, such as neoprene, as discussed above.

The antenna of FIGURE 9 can be considered as the equivalent of three antennas; viz. coils A, B and C, each of different length and symmetrically disposed about a common transverse axis and commonly aligned. When power is supplied to the terminal leads 160 and 170, each of the coils pulse to generate an acoustical pressure wave the directions of which are perpendicular to their broad surfaces, i.e. perpendicular to the current flows. Over the length of coil A, the impulse pressure is due to that of coil A added to that of coils B and C whose portions are coextensive with the length of coil A, all as indicated in the figure. Beyond each end of coil A and between the ends thereof and the ends of coil B, the impulse pressure is the addition of the forces exerted by coils B and C over this length. Beyond each end of coil B and between the ends thereof and the ends of coil C, the pressure is the result of coil C alone, all as shown in the figure. The net effect of this configuration is an antenna constructed so as to cause an attenuation of pressure along its length.

The embodiment shown in FIGURE 9 is illustrative of one example of how the energy of the pressure impulse can be attenuated along its length. Any combination of individual coils, however, to provide any desired function of pressure magnitude along the length of the antenna is contemplated by this invention. The desirability of different attenuations along the length of a line source for different geographical locations is discussed in the publication by J. O. Parr, Jr. and W. H. Mayne, entitled, A New Method of Pattern Shooting, Geophysics, vol. XX, No. 3 (July, 1955), pp. 539–564.

Although the invention has been described with reference to detail embodiments thereof, it will become apparent to those skilled in the art that many modifications and substitutions can be made that do not depart from the true scope of the invention as defined in the appended claims.

What is claimed is:

1. An acoustical antenna for generating in a medium a directional pressure impulse having control frequency characteristics comprising; a conductive means wound back and forth on itself to provide a parallel conductor configuration several layers in thickness, said parallel conductor configuration providing first and second portions each of which is elongated and substantially straight along its length, terminal means connected to each of the conductive means, said first portion and said second portion carrying oppositely directed currents in response to a voltage applied across said terminal means, the current direction in any segment of any said first portion being opposite to the current direction in the opposing segment of said second portion, and resilient insulating means encapsulating said first and said second portions and having a surface for engaging said medium, said oppositely directed currents producing an opposing force and separation between said first and second portions causing said resilient insulating means to flex along a line perpendicular to and connecting opposing segments of said first portion and said second portion producing a pressure impulse along the length of said antenna and imparting said impulse to said medium through the surface of said insulating means.

2. An antenna according to claim 1 including means connected to said terminal means for discharging a capacitor through said conductor means.

3. An acoustical antenna for generating in a medium a directional pressure impulse having controlled frequency characteristics, comprising
  (a) conductor means including
    (i) a first plurality of parallel, elongated and substantially straight conducting segments, and
    (ii) a second plurality of parallel, elongated and substantially straight conducting segments disposed in opposing parallel relation to said first plurality of segments, said first and said second conducting segments connected electrically in series with one another forming a continuous winding,
  (b) terminal means connected to said conductor means,
  (c) each of said first plurality of segments carrying current in one direction and each of said second plurality of segments carrying current in a direction opposite to said one direction in response to a voltage applied across said terminal means, and
  (d) resilient insulating means encapsulating said first and said second plurality of segments and having a surface for engaging said medium,
  (e) said oppositely directed currents producing an opposing force and separation between said first and said second plurality of segments and causing said resilient insulating means to flex along a line perpendicular to and connecting said first and said second plurality of segments,
  (f) whereby a pressure impulse is imparted to said medium through said surface upon flexing of said resilient insulating means.

4. An antenna according to claim 3 including means connected to said terminal means for discharging a capacitor through said conductor means.

5. An acoustical antenna for generating in a medium a directional pressure impulse having controlled frequency characteristics, comprising
  (a) a flattened conducting coil having elongated, substantially straight first and second conducting portions disposed in parallel relation,
  (b) terminal means connected to said coil,
  (c) said first and second portions carrying oppositely directed currents in response to a voltage applied across said terminal means, and
  (d) resilient insulating means encapsulating said first and second portions and having a surface for engaging said medium,
  (e) said oppositely directed currents producing an opposing force and separation between said first and said second portions and causing said resilient insulating means to flex along a line perpendicular to and connecting said first and said second portions,
  (f) whereby a pressure impulse is imparted to said medium through said surface upon flexing of said resilient insulating means.

6. An antenna according to claim 5 including means connected to said terminal means for discharging a capacitor through said coil.

7. An antenna according to claim 5 wherein each of said first and said second portions comprise a plurality of parallel conducting segments.

8. An antenna according to claim 7 wherein each of said plurality of conducting segments is comprised of a plurality of rows and a plurality of layers.

9. An antenna according to claim 7 wherein each of said segments is comprised of a flattened conductor.

10. An antenna according to claim 9 wherein said flattened conductor is flexible.

11. An antenna according to claim 5 wherein said coil is comprised of a single continuous flattened conductor.

12. An acoustical antenna for generating in a medium a directional pressure impulse having controlled frequency characteristics, comprising
  (a) conductor means including a plurality of flattened conducting coils each having elongated, substantially straight first and second conducting portions disposed in parallel relation,
  (b) each of said coils having a different length as defined by the length of its respective first and second portions,
  (c) said plurality of coils being disposed in concentric relation as defined by an axis passing between said first and second portions perpendicular thereto and symmetrical therewith, with the coils of smaller lengths being surrounded by the coils of larger lengths,
  (d) said plurality of coils being interconnected in electrical parallel,
  (e) terminal means connected to said conductor means,
  (f) each of said first portions of each of said plurality of coils carrying currents in one direction and each of said second portions of each of said plurality of coils carrying currents in a direction opposite to said one direction in response to a voltage applied across said terminal means, and
  (g) resilient insulating means encapsulating said first and said second portions of said plurality of coils and having a surface for engaging said medium,
  (h) said oppositely directed currents producing an opposing force and separation between said first and said second portions of each of said plurality of coils and causing said resilient insulating means to flex along a line connecting said first and said second portions perpendicular to said axis,
  (i) whereby a non-uniform pressure impulse is generated in said medium at said surface along the lengths of said plurality of coils, the pressure at any point along said surface being related to the number of coils acting in cooperation at said point.

13. An antenna according to claim 12 including means connected to said terminal means for discharging a capacitor through said conductor means.

14. An antenna according to claim 12 wherein each of said first and second portions of each of said plurality of coils is comprised of a plurality of parallel rows and layers.

15. An antenna according to claim 14 wherein each of said rows and layers is comprised of a flattened conductor.

16. An antenna according to claim 15 wherein said flattened conductor is flexible.

17. An acoustical antenna for generating in a medium a directional pressure impulse having controlled frequency comprising, a length of flexible conductive cable having a second length folded back upon a first length and wrapped around said first and second lengths to form a plurality of elongated parallel layers, said layers being in two distinct groups, one group being the layers on one side of a line drawn between the first length of cable and the second length of cable, and the other group being the layers of cable on the other side of said line, terminal means connected to the end of said cable, each of said one group of layers carrying current in one direction and each of the other layers in the other group carrying current in a direction opposite to said one direction in response to a voltage applied across said terminal means, and resilient insulating means encapsulating said layers of cable and having a surface engaging said medium, said oppositely directed currents producing an opposing force and separation between said first and said second lengths of cable forcing each group outwardly causing said resilient insulating means to flex along a line perpendicular to said two groups of layers imparting a pressure impulse to said medium through the surface of said resilient insulating means.

References Cited
UNITED STATES PATENTS

| | | | |
|---|---|---|---|
| 2,648,837 | 8/1953 | Mounce | 340—400 |
| 2,649,579 | 8/1953 | Alexander | 340—17 |
| 2,964,730 | 12/1960 | Blanchard | 340—12 |

BENJAMIN A. BORCHELT, *Primary Examiner.*

P. A. SHANLEY, *Assistant Examiner.*